United States Patent

[11] 3,551,696

[72] Inventor George William Gray
Lambertville, N.J.
[21] Appl. No. 634,727
[22] Filed Apr. 28, 1967
[45] Patented Dec. 29, 1970
[73] Assignee RCA Corporation
a corporation of Delaware

[54] OSCILLATING VOLTAGE RANGE INDICATOR
6 Claims, 5 Drawing Figs.
[52] U.S. Cl. .................................................. 307/235,
307/289, 307/290, 328/115, 328/146, 331/113
[51] Int. Cl. .................................................. H03l 5/20
[50] Field of Search .......................................... 307/235,
276, 289, 290; 328/5, 115, 146; 331/59

[56] References Cited
UNITED STATES PATENTS
2,935,626  5/1960  Mac Sorley .................. 307/290X
2,995,668  8/1961  Sharaf .......................... 307/290X
3,300,654  1/1967  Delancy et al. ............... 307/290

OTHER REFERENCES
Millman and Taub, Pulse, Digital and Switching Waveforms, McGraw-Hill, N.Y. 1965 (p. 422, 437 and 438), Strauss, Wave Generation and Shaping, McGraw-Hill, N.Y. 1960 (p. 303— 306).

Primary Examiner—Donald D. Forrer
Assistant Examiner—R. C. Woodbridge
Attorney—Edward J. Norton ABSTRACT: Apparatus including a feedback amplifier for providing an oscillating output at an output terminal thereof when the apparatus is operating properly and only when the input voltage applied to an input terminal thereof is within a certain range of voltages, that is, within a voltage window.

INVENTOR
GEORGE W. GRAY

BY *Simon Yaffee*
ATTORNEY

INVENTOR
GEORGE W. GRAY

BY Simon, Yaffee
ATTORNEY

_3,551,696_

OSCILLATING VOLTAGE RANGE INDICATOR

BACKGROUND OF THE INVENTION

One example of arts which involve the use of a voltage window indicating apparatus is vehicle presence detectors. Vehicle presence detectors have been built in which an output voltage is developed which is between predetermined limits, that is, within a predetermined voltage range or within a predetermined voltage window, when there is no vehicle in the vehicle detection zone of the vehicle detecting apparatus, and in which the output voltage is either above or below the predetermined limits when a vehicle does appear in the detection zone. Since it is more dangerous to indicate that there is no vehicle in the detection zone when in fact a vehicle is present therein than the contrary, it is advantageous to provide means that indicates the presence of a vehicle in the detection zone and, also, when the apparatus is not operating properly, whether or not a vehicle is in the detection zone. That is, it is advantageous to provide a vehicle detecting indicator which fails safely.

It is an object of this invention to provide an improved apparatus for indicating whether or not a voltage applied to the apparatus is between predetermined limits.

It is another object of this invention to provide an apparatus for indicating whether or not a voltage applied thereto is between predetermined limits and for indicating that the applied voltage is outside of these limits when the apparatus is out of order.

SUMMARY OF THE INVENTION

In accordance with the invention, an apparatus is provided including an amplifier having feedback means. The feedback means is so adjusted that the amplifier is stable, that is, it does not oscillate under predetermined condition of current flow in the amplifier. Voltage responsive means are provided for so changing the current flow in the amplifier that it oscillates only when an input voltage is applied to the amplifier which lies between predetermined limits. However, any input voltage which is below or above the predetermined limits does not cause oscillations of the amplifier. Failure of many elements of the apparatus including the amplifier will prevent oscillations thereof. Therefore, when an element of the amplifier has failed in such a manner that the amplifier cannot oscillate, no oscillations will be produced thereby regardless of the input voltage applied to the amplifier. Also, failure of certain other elements of the apparatus will so change the range of input voltages that cause the apparatus to oscillate, that the apparatus will not oscillate in response to any input voltage that is likely to be applied to its input terminals. Therefore, the apparatus indicates when the input voltage applied thereto is within a predetermined voltage window in a fail safe manner.

BRIEF DESCRIPTION OF THE DRAWING

The invention will be better understood when the following detailed description thereof is read in conjunction with the accompanying drawing in which.

DESCRIPTION

Figure 1:
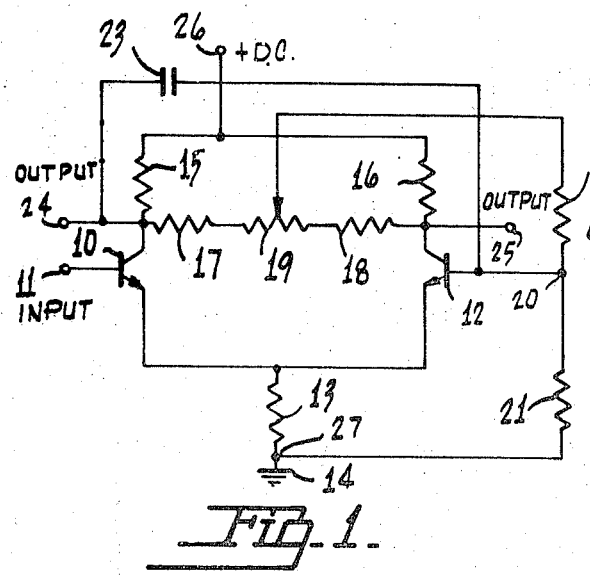
FIGS. 1 to 5 are circuit diagrams of different embodiments of the invention.

Turning first to FIG. 1, the emitters of a pair of NPN transistors 10 and 12 are directly connected together and through a large resistor 13 to a terminal 27 which is itself connected to a point of reference potential or ground 14. The collectors of the two transistors 10 and 12 are connected together through two resistors 15 and 16 in series. The junction of the two resistors 15 and 16 is directly connected to a positive terminal 26 of a voltage regulated source of direct current (not shown). The collectors of the two transistors 10 and 12 are also connected together by two resistors 17 and 18 and an intervening potentiometer 19 all connected in series. The slider of the potentiometer 19 is connected to the terminal 27 through resistors 22 and 21 in series. The junction 20 of the resistors 22 and 21 is connected to the base of the transistor 12. A feedback capacitor 23 is connected between the collector of the transistor 10 and the base of the transistor 12.

In explaining the operation of the circuit of FIG. 1, it is first assumed that the capacitor 23 and the resistors 17 and 18 and the potentiometer 19 are all omitted and that a bias circuit is provided for the transistor 12 which will render the transistor 12 conductive but not in a saturated manner. As noted above, the resistor 13 is large whereby the current flow therethrough from the voltage regulated source (not shown) connected to the terminal 26 is substantially constant. In the circuit so modified, when no input voltage is applied to the input terminal 11, which is connected to the base of the transistor 10, with respect to ground 14, the transistor 10 is nonconducting. Since the transistor 12 is conductive, all the current flowing through the resistor 13 flows through the transistor 12. Now, as the input voltage applied to the input terminal 10 rises in a positive direction, the transistor 10 becomes more and more conductive whereby the transistor 10 shares the current passed by the resistor 13 with the transistor 12. Soon, as the input voltage rises, the current taken by the transistor 10 is as great as the current taken by the transistor 12 and finally, the transistor 10 takes most of the current flow through the resistor 13, leaving very little current for the transistor 12.

Let it now be assumed that the capacitor 23 (but not the resistors 17 and 18 and the potentiometer 19) is connected as pointed out hereinabove, the transistor 12 still being biased to conduction but not in a saturated manner, and that the current input to the base of the transistor 10 is increased from zero to a high positive value. Oscillations will appear between the output terminals 24 and 25, which are connected respectively to the collectors of the transistors 10 and 12, during the period when the current flow in the transistors 10 and 12 would, except for the presence of the capacitor 23, be equal or nearly so, but not when the current flow through the two transistors 10 and 12 is very different. These oscillations will also appear between either of the terminals 24 and 25 and the terminal 27. Therefore, the circuit of FIG. 1 exhibits output oscillations only when the voltage applied between the base of the transistor 10 (input terminal 11) and ground 14 (input terminal 27) is between certain limits. That is, the circuit of FIG. 1 is an apparatus for indicating that a voltage applied thereto is within predetermined limits or within a predetermined range or within a predetermined voltage window.

Let it now be assumed that the resistors 17 and 18 and the potentiometer 19, as well as the connection of the base of the transistor 12 through the resistor 22 to the slider of the potentiometer 19 and through the resistor 21 to the terminal 27 are also included, that is, that the circuit of FIG. 1 is as described hereinabove. The bias current applied to the base of transistor 12 is such as to make the transistor 12 conductive, but not in a saturated manner. However, there will be a direct current feedback from the potentiometer 19 to the base of the transistor 12. This feedback connection to the base of the transistor 12 is in effect a gain or amplification control. The gain of the transistor 12 becomes greater as the slider of the potentiometer 19 is moved towards the collector of the transistor 10 and less as the slider of the potentiometer 19 is moved towards the collector of the transistor 12. As the gain increases, oscillations will appear at the output terminals 24 and 25 over a progressively lesser range of input voltages applied to the input terminal 10 until the circuit of FIG. 1 acts as a trigger circuit. The resistor 17 functions to prevent the potential feedback to the base of the transistor 12, upon moving the slider of the potentiometer 19, from arriving at the trigger circuit value. Conversely, as the slider of the potentiometer is moved to decrease the gain of the transistor 12, oscillations will appear at the output terminals 24 and 25 over a greater range of voltages applied to the input terminal 11. The resistor 18 is included to prevent widening of the voltage window over which applied voltages at the input terminal 11 produce oscillations beyond a predetermined amount. However, the middle of the range, whether the range itself be increased or decreased, will not vary due to adjustment of the position of the slider of the potentiometer 19. Furthermore, open-circuiting or short-circuiting of the capacitor 23, a transistor 10 or 12, a resistor 13, 15 or 16, will prevent oscillations from appearing at either output terminal 24 or 25 no matter what the voltage applied to the input terminal 11. Shorting the resistor 17 or opening the resistor 18 will so narrow the voltage window that the described device will not oscillate. However, opening the resistor 17 or shorting the resistor 18 will widen the voltage window. Therefore the circuit of FIG. 1 is substantially fail safe since failure of most of the elements of FIG. 1 will cause failure of oscillations no matter what the input voltage. Since the voltage window apparatus of FIG. 1 may be so used that lack of oscillations at output terminals 24 and 25 indicates presence of a vehicle in the vehicle sensing zone of a connected vehicle detector (not shown), the circuit of FIG. 1 indicates that a vehicle is in the detection zone when there is one there and also indicates that a vehicle is in the detection zone when the circuit of FIG. 1 has failed as indicated above.

Figure 2:
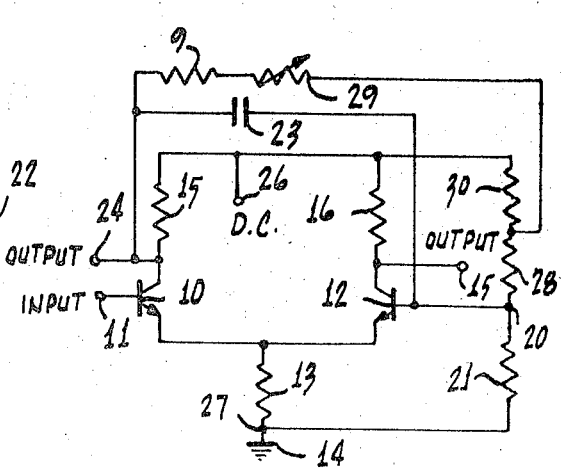

In the circuits of FIGS. 1 and 2, similar elements similarly connected have been provided with similar reference characters. FIG. 2 differs from FIG. 1 in that resistors 17, 18, 22 and potentiometer 19 of FIG. 1 are omitted in FIG. 2 and that instead thereof resistors 9 and 28 and an intervening variable resistor 29, all in series, are included in FIG. 2 between the output terminal 24 and the terminal 20, and that a resistor 30 is connected between the DC terminal 26 and the junction of the resistors 28 and 29. The embodiment of the invention as shown in FIG. 2 is not so sensitive to temperature changes as the embodiment of FIG. 1. For example, in FIG. 1, changes in temperature, which affect both transistors 10 and 12 cause similar changes of potential at the collectors of the transistors 10 and 12. This changed potential, which is applied to both ends of the series resistive circuit comprising the resistive elements 17, 18 and 19, is fed back through the resistor 22 (which attenuates this change in potential) to the base of the transistor 12. This feedback voltage tends to shift the position or centering of the voltage window indication of the circuit of FIG. 1. In FIG. 2 however, the change in potential at the collector of the transistor 10 due to temperature changes is applied at one end of the series circuit comprising the resistors 9 and 29, and the voltage variation due to temperature change of the transistor 12 is not applied to the base of the transistor 12. The increase in voltage at the collector of the transistor 12 due to temperature effect is therefore more greatly attenuated in FIG. 2 than in FIG. 1 and therefore the position or centering of the voltage window is not changed as much by temperature in FIG. 2 as in FIG. 1.

If the resistors 9, 28 and 29, comprising the feedback circuit in FIG. 2 or either of these resistors is shorted or open-circuited the position of the window will not change but only the width of the window will vary. The circuit of FIG. 3 is provided to reduce the effect of failure of elements comprising the direct current feedback circuit of FIG. 2.

Figure 3:
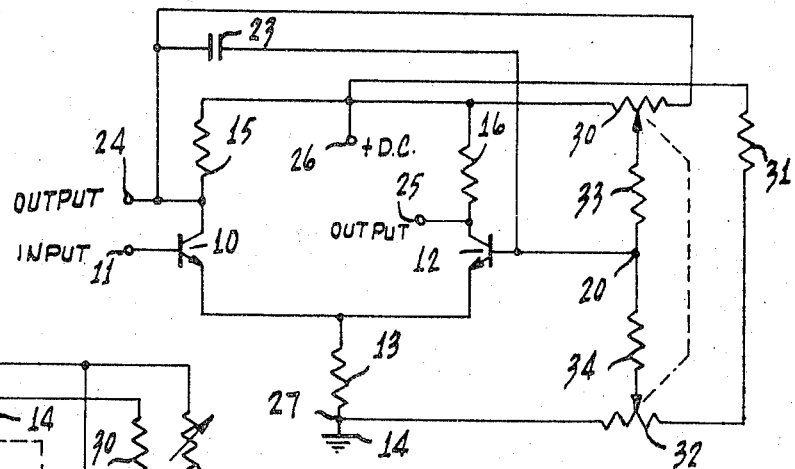

Similar reference characters are applied to similar elements similarly connected in FIGS. 1 and 3. FIG. 3 differs from FIG. 1 in that the elements 17, 18, 19 and 22 are omitted from FIG. 3, and a potentiometer 30 is connected between the output terminal 24 and the DC terminal 26. Also, a resistor 31 and another potentiometer 32 are connected in series between the terminal 26 and the terminal 27. The sliders of the potentiometers 30 and 32 are connected together through resistors 33 and 34 connected in series, and the junction 20 of the two resistors 33 and 34 is connected to the base of the transistor 12. The sliders of the two potentiometers 33 and 34 are unicontrolled to move in the same direction as viewed in FIG. 3. As has been noted above, if the DC feedback circuits in FIGS. 1 and 2 fail, the width of the window will change but not its position. Therefore, under such a condition the circuits of FIGS. 1 and 2 may show absence of a vehicle in the protected zone when in fact there is a vehicle in the protected zone.

However in the circuit of FIG. 3, if either of the resistors 33 or 34 become shorted or open, the voltage window will be shifted out of the usual or expected range of input voltages which are normally applied to the terminal 11. Similarly, if either potentiometer 30 or 32 becomes open or shorted, the window in FIG 3 will shift out of range of normal or expected input voltages. Also, if both resistors 33 and 34 become open-circuited, the circuit of FIG. 3 cannot operate to produce oscillations. Therefore, the circuit of FIG. 3 is more nearly fail safe than the circuits of either FIG. 1 or FIG. 2.

It is advantageous to use a readily pruchasable integrated circuit or chip in constructing the indicator of this invention. The circuit elements and the connections between these elements of such a chip are shown within the dotted rectangle 8 in FIG. 4. The chip within the rectangle 8 comprises a first NPN transistor 35 to whose base the input terminal 11' of the chip 8 is connected. The collector of the transistor 35 is connected directly to a power supply terminal 26'. The emitter of the transistor 35 is connected directly to the base of a second NPN transistor 36. The emitter of the transistor 35 is connected through two resistors 37 and 38 in series to the base of a third NPN transistor 39 and to the emitter of a fourth NPN transistor 40. The junction of the resistors 37 and 38 is connected directly to another power supply terminal 27' of the chip 8. The collector of the transistor 36 is connected directly to the base of another NPN transistor 41 and through a resistor 42 to the terminal 26'. The emitter of the transistor 36 is connected through two resistors 43 and 44 in series to the emitter of the transistor 39. The junction of the resistors 43 and 44 is connected directly to the collector of still another NPN transistor 45.

The collector of the transistor 41 is connected directly to the terminal 26'. The emitter of the transistor 41 is connected to an output terminal 24' of the chip 8 and through two resistors 46 and 47 in series to the emitter of a further NPN transistor 48. The junction of the resistors 46 and 47 is connected to a power supply terminal 50 of the chip 8.

The collector of the transistor 39 is connected directly to the base of the transistor 48 and through a resistor 52 to the terminal 26'. The collector of the transistor 40 is connected directly to the terminal 26', while the base of the transistor 40 is connected to a terminal 20' of the chip 8. The collector of the transistor 48 is connected directly to the terminal 26'. The emitter of the transistor 48 is connected to the output terminal 25' of the chip 8.

The base of the transistor 45 is connected through a resistor 58 to a bias supply terminal 60 of the chip 8. The base of the transistor 45 is also connected through a resistor 62 to another bias supply terminal 64 of the chip 8. The base of the transistor 45 is also connected through the resistor 62 and through two diodes 66 and 70 and a resistor 72, all in series, to the terminal 27'. The diodes 66 and 70 are poled so that their anodes are connected to the base of the transistors 45. The emitter of the transistor 45 is connected through two resistors 74 and 76 in series to the terminal 27'. The junction of the resistors 74 and 76 is connected to another supply terminal 78 for the chip 8.

To this point, only the internal connections of the chip 8 have been described. It will be noted that certain reference characters have been used in FIGS. 1 to 3 without primes for indicating terminals of the circuits of FIGS. 1 to 3, and that the same reference characters, primed however, have been used to indicate corresponding terminals of the chip 8 in FIG. 4. Thus, the terminals 11 and 20 are input terminals in FIGS. 1 to 3 and the terminals 11' and 20' are input terminals of the chip 8. Similarly, the terminals 24 and 25 are output terminals in FIGS. 1 and 3 and the terminals 24' and 25' are output terminals of the chip 8. Also, the terminals 26 and 27 are power terminals in FIGS. 1 to 3 while terminals 26' and 27' are power terminals of the chip 8. It will also be noted that terminals 64, 27' and 78 of the chip 8 are connected together whereby the diodes 66 and 70 and the resistors 72 and 76, which comprise part of the chip 8 and which are not used in the circuit of FIG. 4, are short-circuited.

The external connections of the chip 8 between the several terminals 11', 20', 24', 25', 26' and 27' are similar to the connections in FIG. 1 between the corresponding terminals 11, 20, 24, 25, 26 and 27. For example, the output terminal 24' of the chip 8 is connected by way of a feedback capacitor 23 and a resistor 82 in series to the terminal 20'. The output terminal 24' is also connected by way of two resistors 17 and 18 and an intervening potentiometer 19, all connected in series to the output terminal 25' of the chip 8. The slider of the potentiometer 19 is connected through a resistor 22 to the terminal 20'. The terminal 20' is connected through a resistor 21 and a capacitor 94 in parallel to all of the terminals 64, 27', 78 and 50. The terminals 64, 27', 78 and 50 are connected through a resistor 96 to the terminal 60. The terminal 60 is connected to ground 14 through the resistor 98. A source of voltage regulated direct current potential (not shown) which is negative with respect to ground 14 is connected to the terminals 64, 27', 78 and 50. The power terminal 26' of the chip 8 is connected to ground 14.

Figure 4:
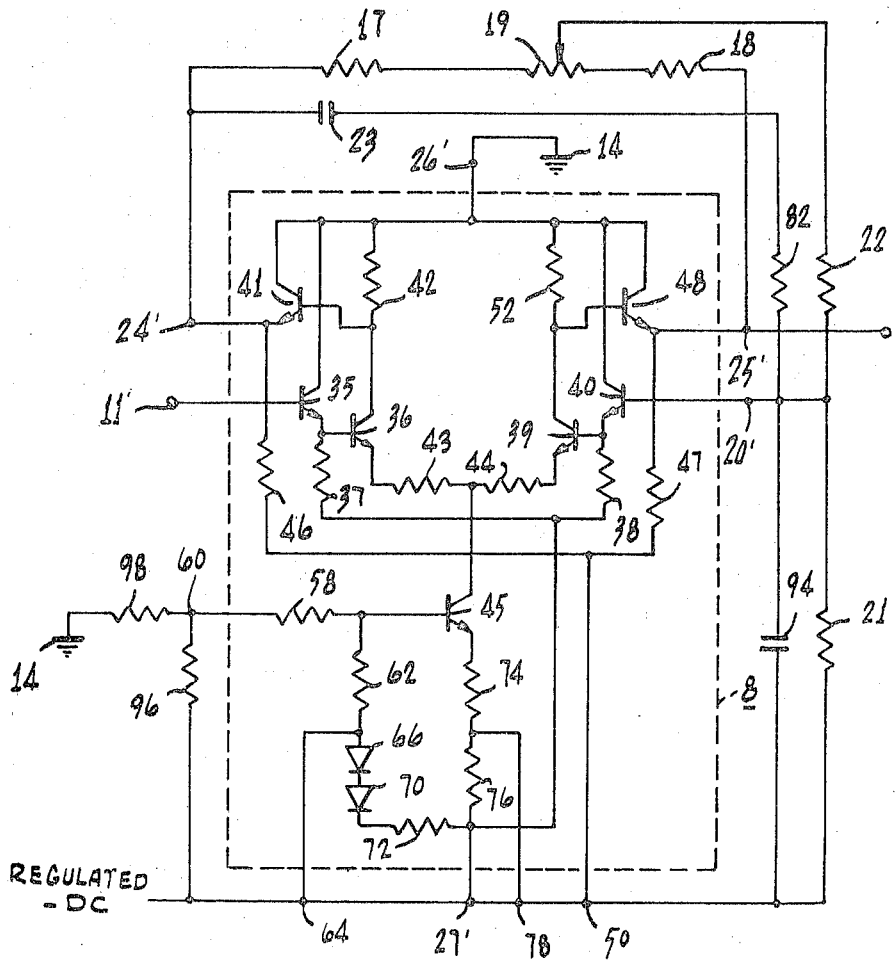

In operation, the circuit of FIG. 4 operates similarly to that of FIG. 1. For example, the resistors 98, 96, 58, 62 and 74 and the transistor 45 together act as a constant current device. This is due to the fact that the voltage applied to the base of the transistor 45 by the voltage regulated direct current source (not shown) by way of the resistors 58, 62, 96 and 98 is substantially constant. Therefore the voltage of the emitter of the transistor 45 also is substantially constant, whereby the voltage drop across the resistor 74 is substantially constant. Therefore the current flow through the resistor 74 is substantially constant and the current fed to the junction of the resistors 43 and 44 is also substantially constant. The transistors 36 and 39 on the chip 8 operate like the transistors 10 and 12 of FIG. 1. The transistor 35 is connected in a known manner, to increase the input impedance of the transistor 36 whereby the input source connected across the terminals 11' and 27' will not be excessively loaded by the input to the transistor 36. The transistor 40 performs a similar function for the transistor 39. The transistor 41 is connected in a known manner to reduce the output impedance of the transistor 36, thereby better to match the output impedance of the terminal 24' to the input impedance at the terminal 20', and the transistor 48 acts similarly to decrease the output impedance at the transistor 39. Further impedance matching is provided by the resistor 82. The capacitor 94 merely acts as a bypass capacitor for the resistor 21.

Figure 5:
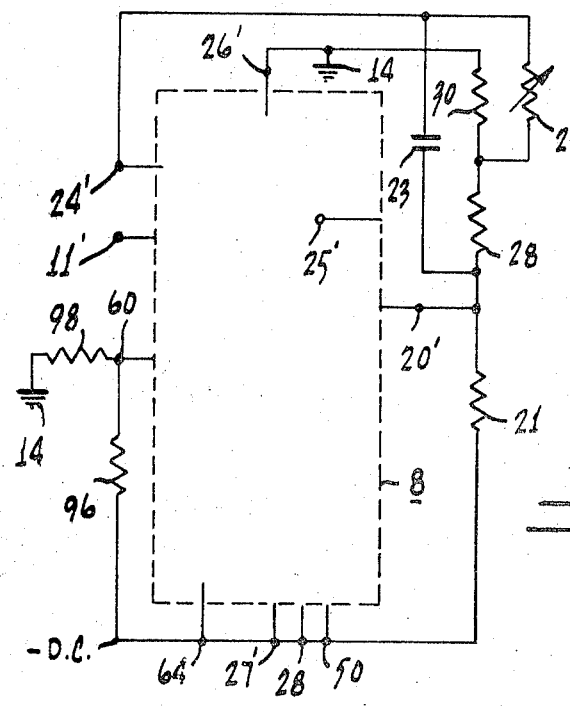

Since the chip 8 of FIG. 4 and the chip 8 of FIG. 5 are identical, the internal connections of the chip 8 are not shown in FIG. 5. The corresponding terminals thereof in FIGS. 4 and 5 have been given the same reference characters. The external connections that are the same in FIGS. 4 and 5 are also given the same reference characters. The other external connections between the terminals 11', 20', 24', 25', 26' and 27' are identical in FIGS. 2 and 5 except that the resistor 9 shown in FIG. 2 has been omitted from FIG. 5. The operation of the circuits of FIGS. 2 and 5 is similar.

The manner in which the chip 8 can be connected to provide the voltage window or range circuit of FIG. 3 has not been specifically shown since this connection is evident when it is realized, as noted above, that the terminals 11, 20, 24, 25, 26, and 27 of FIG. 3 correspond to the terminals 11', 20', 24', 25', 26' and 27' of a chip 8.

I claim:
1. A voltage sensing circuit comprising:
a pair of transistors each having a pair of main electrodes and a control electrode;
means for connecting a source of constant current between the two main electrodes of both of said transistors whereby the constant current divides between said transistors;
means for connecting an impedance element between one main electrode of the first of said pair of transistors and the control electrode of the second of said pair of transistors;
means including a first resistance connecting said one main electrode of said first transistor and the corresponding main electrode of said second transistor and a second resistance connected between a point on said first resistance and the control electrode of said second transistor for varying the amplification of said second one of said pair of transistors; and
means to apply an input voltage to the control electrode of the first of said pair of transistors, whereby oscillations are produced on a main electrode of one of said transistors when the input voltage is within a predetermined range.

2. A voltage sensing circuit comprising:
a pair of transistors each having a pair of main electrodes and a control electrode;
means for connecting a source of constant current between the two main electrodes of both of said transistors whereby the constant current divides between said transistors;
means for connecting an impedance element between one main electrode of the first of said pair of transistors and the control electrode of the second of said pair of transistors;
means including a first resistance connected between the control electrode of said second transistor and a terminal of said source and a second resistance connected between said one main electrode of said first transistor and an intermediate point on said first resistance for varying the amplification of said second one of said pair of transistors; and
means to apply an input voltage to the control electrode of the first of said pair of transistors, whereby oscillations are produced on a main electrode of one of said transistors when the input voltage is within a predetermined range.

3. A voltage sensing circuit comprising:
a pair of transistors each having a pair of main electrodes and a control electrode;
means for connecting a source of constant current between the two main electrodes of both of said transistors whereby the constant current divides between said transistors;
means for connecting an impedance element between one main electrode of the first of said pair of transistors and the control electrode of the second of said pair of transistors;
means including a first resistance connected between said one main electrode of said first transistor and a terminal of said source, a second resistance connected between said terminal and a point of reference potential, and a connection from the control electrode of said second transistor to a point on each of said first and second resistance; and
means to apply an input voltage to the control electrode of the first of said pair of transistors, whereby oscillations are produced on a main electrode of one of said transistors when the input voltage is within a predetermined range.

4. In a circuit which includes a pair of reference points between which a source of potential can be connected, and a pair of transistors, each of said transistors having a collector, base and emitter electrode, said emitter electrodes being coupled together and through a resistance to one of said reference points, said collector electrodes being connected to the other of said reference points, the collector electrode of one of said transistors being coupled to the base electrode of the other of said transistors through a time constant determining circuit, said circuit being responsive to the application of a voltage within a predetermined voltage range between the base of said one transistor and said one reference point to exhibit oscillations at the collector electrodes of said pair of transistors, the improvement comprising: range adjustment means connected between the collector electrode of said one transistor and the base electrode of said other transistor for varying the limits of said voltage range, said range adjustment means including a first resistance connected between said collector electrodes of said pair of transistors and a second resistance connected between the base electrode of said other transistor and a point on said first resistance.

5. In a circuit which includes a pair of reference points between which a source of potential can be connected, and a pair of transistors, each of said transistors having a collector, base and emitter electrode, said emitter electrodes being coupled together and through a resistance to one of said reference points, said collector electrodes being connected to the other of said reference points, the collector electrode of one of said transistors being coupled to the base electrode of the other of said transistors through a time constant determining circuit, said circuit being responsive to the application of a voltage within a predetermined voltage range between the base of said one transistor and said one reference point to exhibit oscillations at the collector electrodes of said pair of transistors, the improvement comprising: range adjustment means connected between the collector electrode of said one transistor and the base electrode of said other transistor for varying the limits of said voltage ranges, said range adjustment means including a first resistance coupled between the base electrode of said other transistor and said other reference point and a variable resistance connected between the collector electrode of said one transistor and a point on said first resistance.

6. In a circuit which includes a pair of reference points between which a source of potential can be connected, and a pair of transistors, each of said transistors having a collector, base and emitter electrode, said emitter electrodes being coupled together and through a resistance to one of said reference points, said collector electrodes being connected to the other of said reference points, the collector electrode of one of said transistors being coupled to the base electrode of the other of said transistors through a time constant determining circuit, said circuit being responsive to the application of a voltage within a predetermined voltage range between the base of said one transistor and said one reference point to exhibit oscillations at the collector electrodes of said pair of transistors, the improvement comprising: range adjustment means connected between the collector electrode of said one transistor and the base electrode of said other transistor for varying the limits of said voltage range, said range adjustment means including a first resistance connected between the collector electrode of said one transistor and said other reference point, a second resistance equal in value to said first resistance connected between said one reference point and said other reference point and means for coupling the base electrode of the other transistor to an equivalent point on each of said first and second resistances.